(12) United States Patent
Wu et al.

(10) Patent No.: US 10,724,646 B2
(45) Date of Patent: Jul. 28, 2020

(54) DUAL MOTOR DRIVEN MULTI FUNCTION HYDRAULIC REGULATING VALVE WITH DUAL VALVE CORE

(71) Applicant: Liaoning Haiyu Fluid Transmission and Control System Co., Ltd., Anshan, Liaoning Province (CN)

(72) Inventors: Haiming Wu, Anshan (CN); Xuesen Chang, Anshan (CN); Yao Yao, Anshan (CN); Haiyan Wu, Anshan (CN)

(73) Assignee: Laioning Haiyu Fluid Transmission and Control System Co., Ltd., Anshan (CN)

(*) Notice: Subject to any disclaimer, the term of this patent is extended or adjusted under 35 U.S.C. 154(b) by 171 days.

(21) Appl. No.: 15/973,730

(22) Filed: May 8, 2018

(65) Prior Publication Data
US 2019/0203844 A1    Jul. 4, 2019

(30) Foreign Application Priority Data
Dec. 29, 2017    (CN) .......................... 2017 1 1497901

(51) Int. Cl.
| F16K 11/22 | (2006.01) |
| F16K 31/04 | (2006.01) |
| F16K 11/085 | (2006.01) |
| F15B 13/02 | (2006.01) |

(52) U.S. Cl.
CPC .......... F16K 11/22 (2013.01); F16K 11/0853 (2013.01); F16K 31/041 (2013.01); F16K 31/042 (2013.01); F15B 13/02 (2013.01)

(58) Field of Classification Search
CPC ...... F16K 11/22; F16K 11/0853; F16K 11/20; F16K 11/0856; F15B 13/02; F15B 2211/30565; F15B 13/06
See application file for complete search history.

(56) References Cited

U.S. PATENT DOCUMENTS

| 6,619,321 B2* | 9/2003 | Reid, II | ............ F15B 13/0817 |
| | | | 137/625.27 |
| 2007/0039653 A1* | 2/2007 | Maggard | ................ F16K 11/07 |
| | | | 137/625.19 |

FOREIGN PATENT DOCUMENTS

FR    1544824 A * 11/1968 .............. F16B 13/06

* cited by examiner

*Primary Examiner* — Michael R Reid
(74) *Attorney, Agent, or Firm* — Bay State IP, LLC (57) ABSTRACT

The present disclosure relates to a double-juxtaposed-valve-core rotary multi-functional hydraulic regulating valve driven by two motors. The hydraulic regulating valve includes a first regulating component, a second regulating component and a valve block. The first regulating component includes a first motor, a first valve core, a first connection sleeve and a first valve sleeve. The second regulating component includes a second motor, a second valve core, a second connection sleeve and a second valve sleeve. The first motor and the second motor are provided with angular displacement sensors. Both the first valve core and the second valve core include a connection portion and a cylinder portion. The cylinder portion defines a group of crossed radial through holes. Both the first valve sleeve and the second valve sleeve are of hollow cylinder structures.

10 Claims, 9 Drawing Sheets

DUAL MOTOR DRIVEN MULTI FUNCTION HYDRAULIC REGULATING VALVE WITH DUAL VALVE CORE

CROSS REFERENCE TO RELATED APPLICATION

This application claims the benefit of and takes priority from Chinese Patent Application No. 201711497901.6 filed on Dec. 29, 2017, the contents of which are herein incorporated by reference.

TECHNICAL FIELD

The present disclosure relates to the field of hydraulic regulating valves, and in particular to a double-juxtaposed-valve-core rotary multi-functional hydraulic regulating valve driven by two motors.

BACKGROUND

At present, various hydraulic valves driven by motors are widespread. The drive mode is divided into a dual-motor drive mode and a single-motor drive mode.

Current various hydraulic valves driven by two motors generally have complex structures. Compared with controlling a single valve core by a single motor, driving double valve cores to work by two motors is more difficult to achieve an equivalent control effect. For example, Chinese patent with Application Number 200510082720.8 discloses a "Rotary Digital Direction Flow Valve Without Shaft Extension", which includes a main valve core and a slave valve core. The valve core has teeth arranged on the outer circumference thereof and is coupled with a motor via a gear, thereby avoiding defects such as slipping. However, the teeth processing on the outer circumference of the valve core increases the difficulty of manufacturing and the structure is more complex. Furthermore, the coupling with the motor via the gear also reduces the control precision. Chinese patent with publication number CN88200510U discloses a "Rotary Hydraulic Servo Valve", which includes two valve cores that are rotated relative to each other and are driven to rotate by two motors respectively. The two valve cores are not symmetrical. One valve core has three holes while the other valve core has one oil return hole, thus the two valve cores are not stressed evenly. Moreover, an oil return hole is defined on an end cap, thus the end cap is affected by liquid pressure and the structure is instable. Chinese patent with publication number CN103089732B discloses a "Double-Valve-Core Rotary Type Direction Throttle Valve Driven By Two Motors", wherein channels A and B form one valve core and channels P and T form the other valve core. The two valve cores are driven by respective motors. If to realize individual channel control, two drive motors are needed to coordinate and control respectively. Since the valve structure determines that the control precision must be higher than a difference between a diameter of the P, T hole channel of the valve core P, T and a diameter of an orifice sealing pin of the P, T in an annular groove C of the valve core A, B, the two drive motors must have respective position feedbacks and the precision must be higher than the control precision. Chinese patent with publication number CN102889254A discloses a "Dual-Drive Servo Valve And Control Method Thereof", wherein one motor at one end drives a valve core through a lead screw to convert a rotational motion into a linear motion, thereby driving the valve core to slide inside a valve body. The valve body of the valve core has a structure similar to a universal solenoid valve. A nut at the other end is connected to the other motor. The motor at the nut end controls the fine tuning of the opening of the valve hole. The regulation precision is restricted by mechanical processing, screw thread range and precision. Since the two motors at the two ends are controlled simultaneously, both processing difficulty and control difficulty are increased.

In the prior art, direction control hydraulic valves adopting spool valve structures can realize control in direction only, and pressure or flow hydraulic valves can realize control of pressure or flow only. One same valve body cannot realize multiple different control modes and have a single function.

To sum up, for the single-valve-core hydraulic valves in the prior art, one cannot realize multipurpose use and cannot achieve multiple control modes by directly operating the valve core.

The information disclosed in the above background is merely to improve the understanding of the general background of the present disclosure, and cannot be viewed as recognizing or implying in any form that the information already becomes the available technology commonly known by the ordinary skill in the art.

SUMMARY

In order to solve the problems in the prior art that the processing difficulty and control difficulty of the valve core are big, the present disclosure provides a double-juxtaposed-valve-core rotary multi-functional hydraulic regulating valve driven by two motors, which hydraulic regulating valve can realize arbitrary switch of work condition and work nature (directional valve, proportional valve, servo valve) through software control as needed, saves energy, has low cost and has low demand on oil liquid cleanliness, and is simple in structure and flexible to control.

The present disclosure solves the technical problem adopting the following technical scheme. The hydraulic regulating valve includes a first regulating component, a second regulating component and a valve block.

The first regulating component includes a first motor, a first valve core, a first connection sleeve and a first valve sleeve.

The second regulating component includes a second motor, a second valve core, a second connection sleeve and a second valve sleeve.

The first motor and the second motor are provided with angular displacement sensors that are used for monitoring the angle of rotation of the motor.

Both the first valve core and the second valve core include a connection portion and a cylinder portion. The connection portion is used for connection to the first motor and the second motor. The cylinder portion defines a group of crossed radial through holes. The two radial through holes have an included angle α there-between.

Both the first valve sleeve and the second valve sleeve are of hollow cylinder structures. Both the first valve sleeve and the second valve sleeve define three groups of radial interconnecting holes, an annular groove and an axial groove. The axial groove is corresponding to and communicated with the interconnecting hole. Each group of interconnecting holes has the two holes symmetrical with respect to the center, wherein one group of interconnecting holes in the middle forms an included angle α with the other two groups of interconnecting holes on the two sides thereof respectively. The interconnecting hole is corresponding to the radial through hole.

The first connection sleeve is used for connecting the first motor and the valve block, and the second connection sleeve is used for connecting the second motor and the valve block.

The core block defines a group of installing holes thereon. The installing hole is in sealing fit with the valve sleeve. The core block has one side defining four ports (arranged symmetrically), which are port A, port B, port P and port T respectively. The port A is connected to the middle interconnecting hole on the first valve sleeve through a path in the valve block. The port B is connected to the middle interconnecting hole on the second valve sleeve through a path in the valve block. The ports P and T are connected to the two groups of interconnecting holes on the two sides of the middle hole on the first valve sleeve and the second valve sleeve respectively.

The present disclosure further solves the technical problem adopting the following technical scheme. The first motor and the second motor are servo motors or step motors.

The present disclosure further solves the technical problem adopting the following technical scheme. The connection portion has a diameter greater than that of the cylinder portion, thereby forming a limit platform, and the limit platform fits the first valve sleeve or the second valve sleeve, thereby limiting the position of the first valve core or the second valve core.

The present disclosure further solves the technical problem adopting the following technical scheme. Both the first connection sleeve and the second connection sleeve are provided with a limit part, and the limit part is used for limiting the position of the first valve sleeve or the second valve sleeve.

The present disclosure further solves the technical problem adopting the following technical scheme. The connection portion has a top end defining a connection hole, the connecting hole has a connection groove defined therein, and the connection portion is connected to the motor through the connection hole and the connection groove.

The present disclosure further solves the technical problem adopting the following technical scheme. The included angle between the two radial through holes is 60 degrees.

The present disclosure further solves the technical problem adopting the following technical scheme. The valve block further defines a first lateral hole and a second lateral hole, the first lateral hole is communicated with the annular groove on the first valve sleeve, and the second lateral hole is communicated with the port A on the valve block through the middle group of interconnecting holes and the axial groove on the valve sleeve and through a channel on the valve block.

The present disclosure further solves the technical problem adopting the following technical scheme. The annular groove on the first valve sleeve is connected to the annular groove on the second valve sleeve through a path in the valve block.

The present disclosure further solves the technical problem adopting the following technical scheme. The valve block further defines a third lateral hole and a fourth lateral hole, and both the third lateral hole and the fourth lateral hole make the port T on the valve block communicated with the annular groove on the first valve core and the annular groove on the second valve core, through a channel on the valve block.

The present disclosure further solves the technical problem adopting the following technical scheme. The valve block further defines a fifth lateral hole, and the fifth lateral hole is communicated with the port B on the valve block through an axial groove connected to the middle group of interconnecting holes on the second valve sleeve and through a channel on the valve block.

Through the above technical schemes, the present disclosure has the following beneficial effects.

1. Each valve core of one same valve block has different control modes, such as individual control, synchronous control, etc.

2. The device is simple and compact in structure, has an integrated structure, and has perfect functions.

3. The device is contamination resistant, interference resistant and highly reliable.

4. The device can realize digital control and the servo operating point is adjustable.

BRIEF DESCRIPTION OF THE DRAWINGS

To better describe the technical scheme in the embodiment of the present disclosure or in related art, accompanying drawings needed in the description of the embodiment or related art are simply illustrated below. Obviously, accompanying drawings described hereinafter merely illustrate some embodiments of the present disclosure. For the ordinary staff in the field, other relevant accompanying drawings may be obtained according to these accompanying drawings without creative work.

DESIGNATORS IN THE DRAWINGS 1 represents a first regulating component, 11 represents a first motor, 12 represents a first valve core, 121 represents a connection portion, 1211 represents a connection hole, 1212 represents a connection groove, 122 represents a cylinder portion, 1221 represents a radial through hole, 123 represents a limit platform, 13 represents a first connection sleeve, 14 represents a first valve sleeve, 141 represents an interconnecting hole, 142 represents an annular groove, 143 represents an axial groove, 144 represents a limit part, 2 represents a second regulating component, 21 represents a second motor, 22 represents a second valve core, 23 represents a second connection sleeve, 24 represents a second valve sleeve, 3 represents a valve block, 301 represents a port A, 302 represents a port B, 303 represents a port P, 304 represents a port T, 305 represents an installing hole, 306 represents a first lateral hole, 307 represents a second lateral hole, 308 represents a third lateral hole, 309 represents a fourth lateral hole, and 310 represents a fifth lateral hole.

DESCRIPTION OF THE EMBODIMENTS

The purpose, technical scheme and advantages of the embodiments of the present disclosure will become more clearly understood from the clear and complete description of the technical scheme of the embodiments of the present disclosure below taken in conjunction with the accompanying drawings in the embodiments of the present disclosure. Obviously, the embodiments described hereinafter are simply part embodiments of the present disclosure, but all the embodiments. Generally, the modules mentioned in the embodiments of the present disclosure described and illustrated in the drawings can be deployed and designed in a variety of arrangements.

Therefore, the following detailed description for the embodiments of the present disclosure provided in the drawings is not intended to limit the scope of protection of the present disclosure, but merely to illustrate the selected embodiments of the present disclosure. All other embodiments obtained by the ordinary skill in the art based on the embodiments in the present disclosure without creative work are intended to be included in the scope of protection of the present disclosure.

It should be noted that similar designators and letters express similar items in the drawings below. Therefore, once some item is defined in one drawing, no further definition and illustration are needed in the subsequent drawings.

In the description of the present disclosure, it is to be noted that directional or positional terms such as "centre", "above", "below", "left", "right", "vertical", "horizontal", "inside", "outside", etc. are only used with reference to the orientation of the accompanying drawings, or indicate the common directions or positions for placement when the product of the present disclosure is used. The directional or positional terms are merely to conveniently describe the present disclosure and simplify the description, but to indicate or imply the designated device or element to be constructed and operated in a specific position or in a specific direction. Therefore, the used directional or positional terms cannot be understood as a limit to the present disclosure. In addition, terms such as "first", "second", "third", etc. are merely used for the purpose of distinguishing, but cannot be understood as the indication or implication of relative importance.

In addition, terms such as "horizontal", "vertical", etc. are not intended to require the components to be placed absolutely horizontally or vertically, but can allow the components to be slightly inclined. For example, the "horizontal" just means that the direction is horizontal relative to the "vertical"; and the "horizontal" does not indicate that the structure must be completely horizontal and it allows the structure to be slightly inclined.

In the description of the present disclosure, unless otherwise specifically stated and defined, terms such as "provided", "installed", "communicated", "connected", etc. should be interpreted expansively. For example, they may be fixed connection, also may be detachable connection, or integration; may be mechanical connection, also may be electrical connection; may be direct connection, also may be indirect connection through an intermediate, and may be internal communication between two elements. The ordinary skill in this field can understand the specific implication of the above terms in the present disclosure in accordance with specific conditions.

Figure 1:
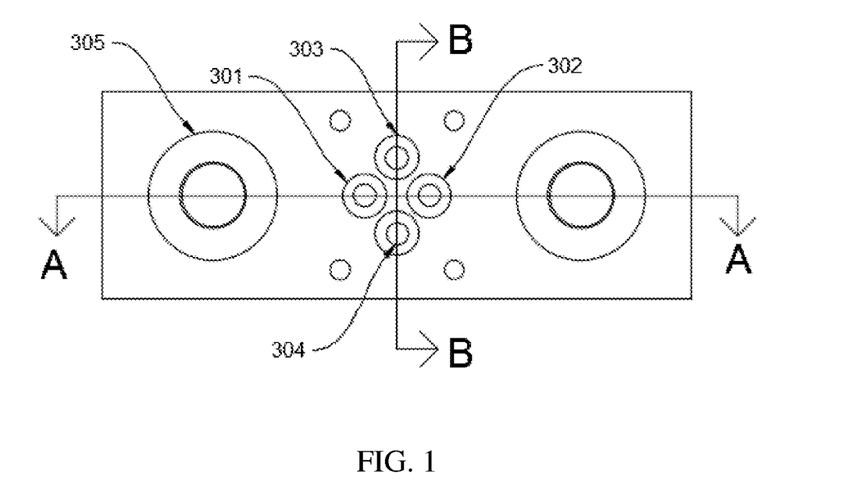
FIG. 1 is a structure diagram of the present disclosure.
Figure 2:
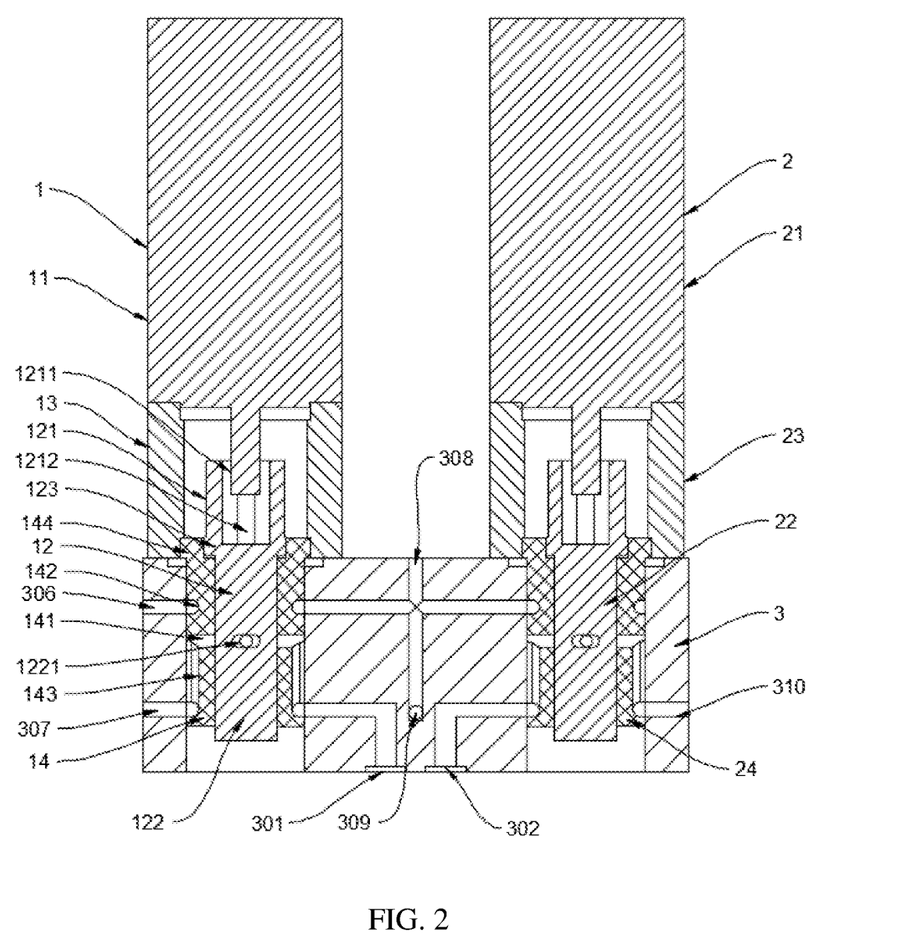
FIG. 2 is a sectional view taken along line A-A of FIG. 1.
Figure 3:
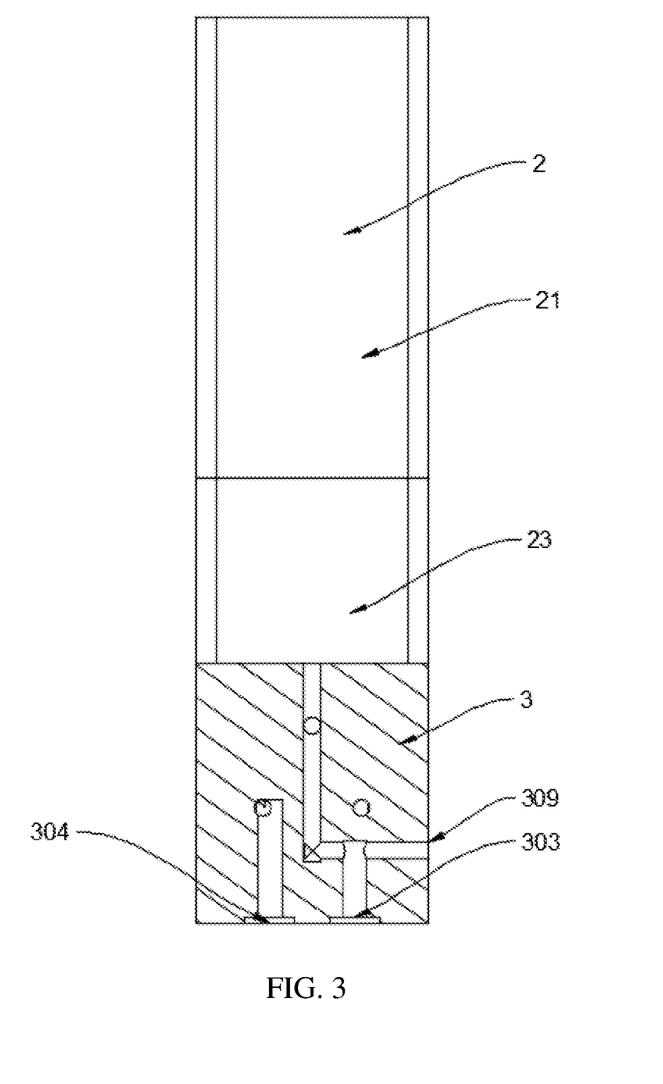
FIG. 3 is a sectional view taken along line B-B of FIG. 1.

A double-juxtaposed-valve-core rotary multi-functional hydraulic regulating valve driven by two motors is provided. Referring to FIG. 1 to FIG. 2, the hydraulic regulating valve includes a first regulating component 1, a second regulating component 2 and a valve block 3.

The first regulating component 1 includes a first motor 11, a first valve core 12, a first connection sleeve 13 and a first valve sleeve 14.

The second regulating component 2 includes a second motor 21, a second valve core 22, a second connection sleeve 23 and a second valve sleeve 24.

The first motor 11 and the second motor 21 are provided with angular displacement sensors that are used for monitoring the angle of rotation of the motor.

Both the first valve core 12 and the second valve core 22 include a connection portion 121 and a cylinder portion 122. The connection portion 121 is used for connection to the first motor 11 and the second motor 21. The cylinder portion 122 defines a group of crossed radial through holes 1221. The two radial through holes 1221 have an included angle α there-between.

Both the first valve sleeve 14 and the second valve sleeve 24 are of hollow cylinder structures. Both the first valve sleeve 14 and the second valve sleeve 24 define three groups of radial interconnecting holes 141, an annular groove 142 and an axial groove 143. The axial groove 143 is corresponding to and communicated with the interconnecting hole 141. Each group of interconnecting holes 141 has the two holes symmetrical with respect to the center, wherein one group of interconnecting holes 141 in the middle forms an included angle α with the other two groups of interconnecting holes 141 on the two sides thereof respectively. The interconnecting hole 141 is corresponding to the radial through hole 1221.

The first connection sleeve 13 is used for connecting the first motor 11 and the valve block 3, and the second connection sleeve 24 is used for connecting the second motor 21 and the valve block 3.

The core block 3 defines a group of installing holes 305 thereon. The installing hole 305 is in sealing fit with the valve sleeve. The core block 3 has one side defining four ports (301/302/303/304), which are port A, port B, port P and port T respectively. The port A 301 is connected to the middle interconnecting hole 141 on the first valve sleeve 14 through a path in the valve block 3. The port B 302 is connected to the middle interconnecting hole 141 on the second valve sleeve 24 through a path in the valve block 3. The ports P and T (303/304) are connected to the two groups of interconnecting holes on the two sides of the middle hole on the first valve sleeve 14 and the second valve sleeve 24 respectively.

In the present disclosure, the interconnecting holes 141 are provided on the lateral surface of the valve sleeve and are designed to be deployed symmetrically, which neutralizes the radial pressure. Such design makes the motor spindle only affected by the rotational torque. The rotational torque is only to overcome the friction, thus the rotational torque is very small and the response speed of the valve is improved. Since the interconnecting holes 141 are provided on the lateral surface of the valve sleeve, when the hydraulic fluid ports start rotating in the condition that the oil path is cut off, either the port A is connected to the port T and the port B is connected to the port P, or, the port A is connected to the port P and the port B is connected to the port T, the condition that the port A is communicated with the port B will never occur. The regulating valve provided by the present disclosure designs a groove structure on the valve core. However, the pressure equalization is not realized through the groove structure, but the stress balance of the valve core is realized through the symmetric layout.

In order to realize the precise control of the first valve core 12 and the second valve core 22, in a preferred embodiment, the first motor 11 and the second motor 21 are servo motors or step motors.

In order to limit the positions of the first valve core 12 and the second valve core 22, in a preferred embodiment, the connection portion 121 has a diameter greater than that of the cylinder portion 122, thereby forming a limit platform 123. The limit platform 123 fits the first valve sleeve 14 or the second valve sleeve 24, thereby limiting the position of the first valve 12 core or the second valve core 22.

In order to further limit the positions of the first valve sleeve 14 and the second valve sleeve 24, in a preferred embodiment, both the first valve sleeve 14 and the second valve sleeve 24 are provided with a limit part 144. The limit part 144 is used for limiting the position of the first valve sleeve 14 or the second valve sleeve 24.

In a preferred embodiment, the connection portion 121 has a top end defining a connection hole 1211; the connecting hole 1211 has a connection groove 1212 defined therein; and the connection portion 121 is connected to the motor through the connection hole 1211 and the connection groove 1212.

In a preferred embodiment, the included angle between the two radial through holes 1221 is 60 degrees.

In a preferred embodiment, the valve block 3 further defines a first lateral hole 306 and a second lateral hole 307; the first lateral hole 306 is communicated with the annular groove 142 on the first valve sleeve 14; and the second lateral hole 307 is communicated with the port A 301 on the valve block 3 through the middle group of interconnecting holes 141 and the axial groove 143 on the valve sleeve 14 and through a channel on the valve block 3. Both the first lateral hole 306 and the second lateral hole 307 are auxiliary holes.

In a preferred embodiment, the annular groove 142 on the first valve sleeve 14 is connected to the annular groove 142 on the second valve sleeve 24 through a path in the valve block 3.

In a preferred embodiment, the valve block 3 further defines a third lateral hole 308 and a fourth lateral hole 309, and both the third lateral hole 308 and the fourth lateral hole 309 make the port T on the valve block 3 communicated with the annular groove 142 on the first valve core 12 and the annular groove 242 on the second valve core 22, through a channel on the valve block 3. Both third lateral hole 308 and the fourth lateral hole 309 are auxiliary holes.

In a preferred embodiment, the valve block 3 further defines a fifth lateral hole 310, and the fifth lateral hole 310 is communicated with the port B 302 on the valve block 3 through an axial groove 143 connected to the middle group of interconnecting holes 141 on the second valve sleeve 24 and through a channel on the valve block 3. The fifth lateral hole 310 is an auxiliary hole.

The working principle of the first regulating component 1 is as follows. When a pulse signal is given to the first motor 11 provided with the angular displacement sensor, the first motor 11 drives the first valve core 12 to rotate by certain angle, and the hole on the first valve core 12 is communicated with the hole on the first valve sleeve 14. When it is needed to change direction, a pulse signal is given to the motor continuously, then the first motor 11 drives again the first valve core 12 to rotate by certain angle, so as to change the communication mode between the hole on the first valve core 12 and the hole on the first valve sleeve 14 and thus to realize direction change. The change of pulse signal can change the angle of rotation of the first valve core 12 driven by the first motor 11, and thus can change the relative positions for connection of the hole on the first valve core 12 and the hole on the first valve sleeve 14, that is to say, the opening of the valve port is changed. Therefore, the control of flow is realized by a digital valve. The control principle of the second regulating component 2 is similar to that of the first regulating component 1.

Figure 4:
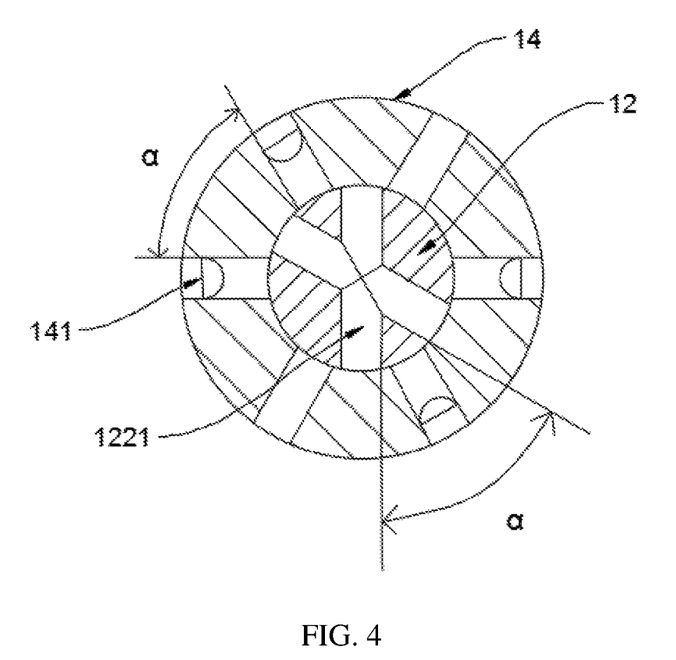
FIG. 4 is a sectional view illustrating an initial state of a first valve core and a first valve sleeve.
Figure 5:
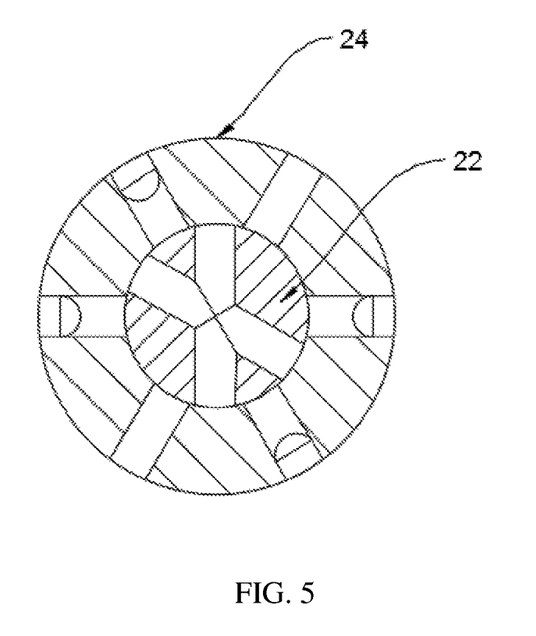
FIG. 5 is a sectional view illustrating an initial state of a second valve core and a second valve sleeve.

During usage, when the first motor 11 and the second motor 21 have no signals, the relative positions of the first valve core 12 and the first valve sleeve 14 are as shown in FIG. 4, in which the port A 301 is disconnected with both the port P 303 and the port T 304, and the relative positions of the second valve core 22 and the second valve sleeve 24 are as shown in FIG. 5, in which the port B 302 is disconnected with both the port P 303 and the port T 304. The two regulating valves are combined to realize the disconnection among the port A 301, the port P 303, the port B 302 and the port T 304.

Figure 6:
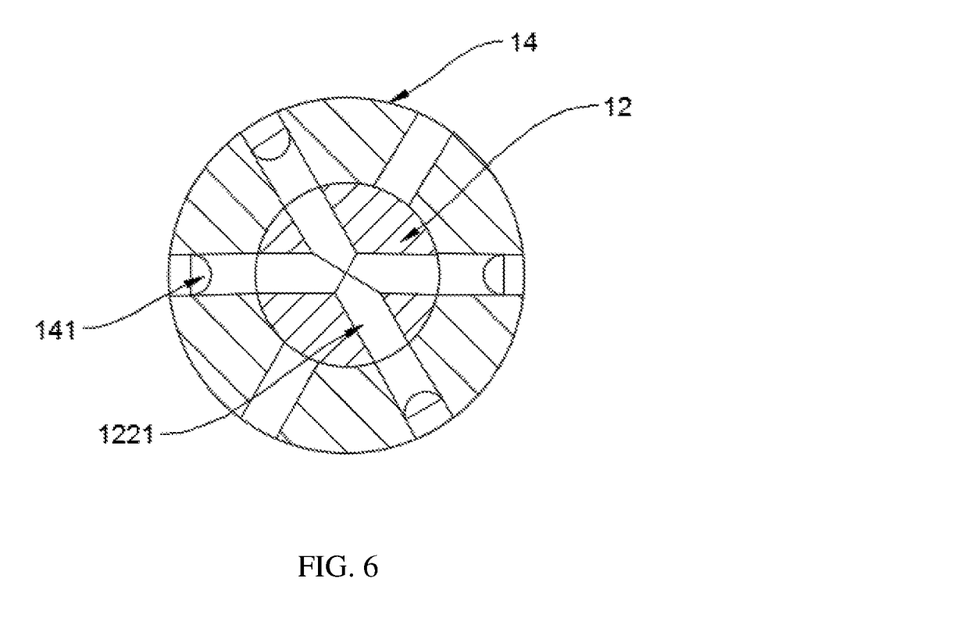
FIG. 6 is a sectional view illustrating the state of the first valve core and the first valve when port A and port P are communicated.
Figure 7:
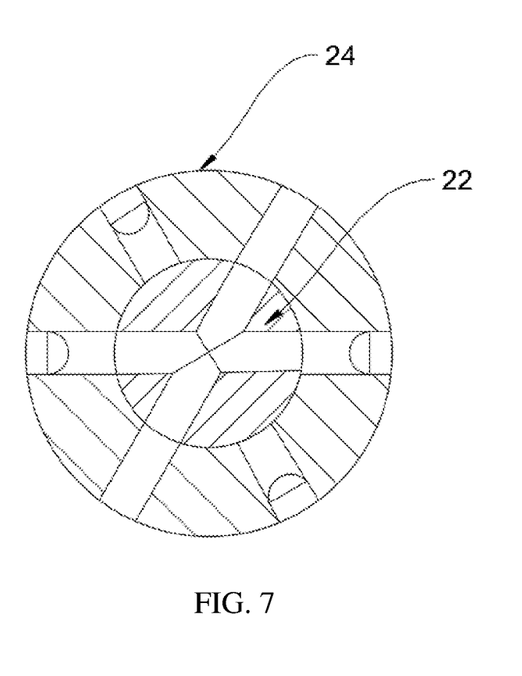
FIG. 7 is a sectional view illustrating the state of the first valve core and the first valve when port B and port T are communicated.

When an M signal is given to the first motor 11 and an N signal is given to the second motor 21, the relative positions of the first valve core 12 and the first valve sleeve 14 are as shown in FIG. 6, in which the port A 301 is communicated with the port P 303 and the port A 301 is disconnected with the port T 304, and the relative positions of the second valve core 22 and the second valve sleeve 24 are as shown in FIG. 7, in which the port B 302 is disconnected with the port P 303 and the port B 302 is communicated with the port T 304. The two regulating valves are combined to realize the communication between the port A 301 and the port P 303 and the communication between the port B 302 and the port T 304.

Figure 8:
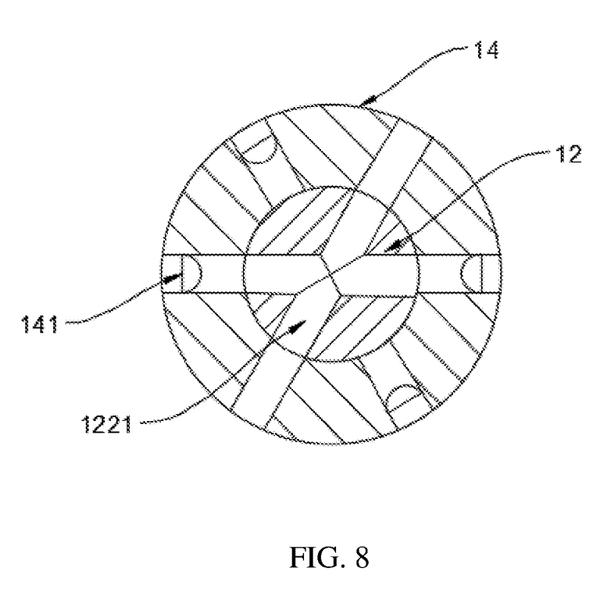
FIG. 8 is a sectional view illustrating the state of the first valve core and the first valve when port A and port T are communicated.
Figure 9:
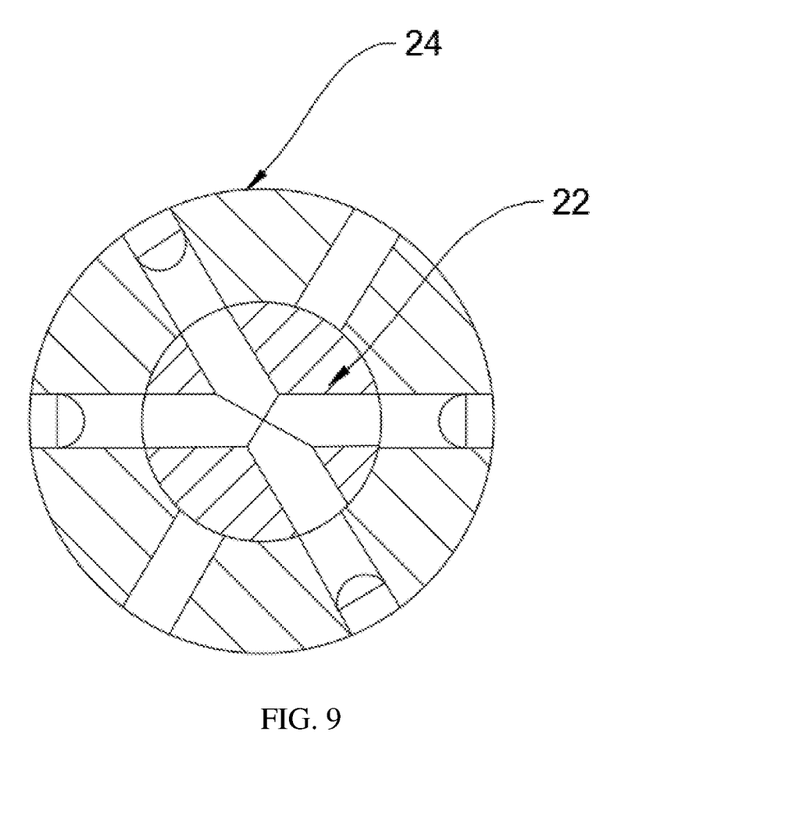
FIG. 9 is a sectional view illustrating the state of the first valve core and the first valve when port B and port P are communicated.

When an X signal is given to the first motor 11 and a Y signal is given to the second motor 21, the relative positions of the first valve core 12 and the first valve sleeve 14 are as shown in FIG. 8, in which the port A 301 is disconnected with the port P 303 and the port A 301 is communicated with the port T 304, and the relative positions of the second valve core 22 and the second valve sleeve 24 are as shown in FIG. 9, in which the port B 302 is communicated with the port P 303 and the port B 302 is disconnected with the port T 304. The two regulating valves are combined to realize the communication between the port A 301 and the port T 304 and the communication between the port B 302 and the port P 302.

The above are the specific embodiments of the present disclosure. However, the protection scope of the present disclosure is not limited to the embodiments. Any variations or substitutions easily produced by one skill familiar with the technical field are intended to fall within the scope of protection of the present disclosure. Therefore, the scope of protection of the present disclosure should be based on the protection scope of the claims appended herein.

What is claimed is:

1. A double-juxtaposed-valve-core rotary multi-functional hydraulic regulating valve driven by two motors, comprising a first regulating component, a second regulating component and a valve block, wherein
   the first regulating component comprises a first motor, a first valve core, a first connection sleeve and a first valve sleeve;

the second regulating component comprises a second motor, a second valve core, a second connection sleeve and a second valve sleeve;

the first motor and the second motor are provided with angular displacement sensors that are used for monitoring the angle of rotation of the motor;

both the first valve core and the second valve core comprise a connection portion and a cylinder portion, the connection portion is used for connection to the first motor and the second motor, the cylinder portion defines a group of crossed radial through holes, and the two radial through holes have an included angle α there-between;

both the first valve sleeve and the second valve sleeve are of hollow cylinder structures, both the first valve sleeve and the second valve sleeve define three groups of radial interconnecting holes, an annular groove and an axial groove, the axial groove is corresponding to and communicated with the three groups of interconnecting holes, each group of interconnecting holes has the two holes symmetrical with respect to the center, wherein one group of interconnecting holes in the middle forms the included angle α with the other two groups of interconnecting holes on the two sides thereof respectively, and each group of interconnecting holes is corresponding to the radial through hole;

the first connection sleeve is used for connecting the first motor and the valve block, and the second connection sleeve is used for connecting the second motor and the valve block; and the valve block defines a group of installing holes thereon, wherein a first installing hole of the group is in sealing fit with the first valve sleeve, and a second installing hole of the group is in sealing fit with the second valve sleeve, and the valve block has one side defining four ports, which are port A, port B, port P and port T respectively; the port A is connected to the middle interconnecting hole on the first valve sleeve through a path in the valve block, the port B is connected to the middle interconnecting hole on the second valve sleeve through a path in the valve block, the ports P and T are connected to the two groups of interconnecting holes on the two sides of the middle hole on the first valve sleeve and the second valve sleeve respectively.

2. The double-juxtaposed-valve-core rotary multi-functional hydraulic regulating valve driven by two motors according to claim 1, wherein the first motor and the second motor are servo motors or step motors.

3. The double-juxtaposed-valve-core rotary multi-functional hydraulic regulating valve driven by two motors according to claim 1, wherein the connection portion of each motor has a diameter greater than that of the associated cylinder portion, thereby forming a limit platform, and the limit platform fits the first valve sleeve or the second valve sleeve, thereby limiting the position of the first valve core or the second valve core.

4. The double-juxtaposed-valve-core rotary multi-functional hydraulic regulating valve driven by two motors according to claim 3, wherein a limit part is provided between the limit platform and the first connection sleeve or the second connection sleeve, and the limit part is used for limiting the position of the first valve sleeve or the second valve sleeve.

5. The double-juxtaposed-valve-core rotary multi-functional hydraulic regulating valve driven by two motors according to claim 1, wherein each connection portion has a top end defining a connection hole, the connecting hole has a connection groove defined therein, and each connection portion is connected to the associated motor through the connection hole and the connection groove.

6. The double-juxtaposed-valve-core rotary multi-functional hydraulic regulating valve driven by two motors according to claim 1, wherein the included angle between the two radial through holes is 60 degrees.

7. The double-juxtaposed-valve-core rotary multi-functional hydraulic regulating valve driven by two motors according to claim 1, wherein the valve block further defines a first lateral hole, the first lateral hole is communicated with the annular groove on the first valve sleeve, and the second lateral hole is communicated with the port A on the valve block through the middle group of interconnecting holes and the axial groove on the first valve sleeve and through a channel on the valve block.

8. The double-juxtaposed-valve-core rotary multi-functional hydraulic regulating valve driven by two motors according to claim 1, wherein the annular groove on the first valve sleeve is connected to the annular groove on the second valve sleeve through a path in the valve block.

9. The double-juxtaposed-valve-core rotary multi-functional hydraulic regulating valve driven by two motors according to claim 7, wherein the valve block further defines a third lateral hole and a fourth lateral hole, and both the third lateral hole and the fourth lateral hole make the port T on the valve block communicated with the annular groove on the first valve core and the annular groove on the second valve core, through a channel on the valve block.

10. The double-juxtaposed-valve-core rotary multi-functional hydraulic regulating valve driven by two motors according to claim 9, wherein the valve block further defines a fifth lateral hole, and the fifth lateral hole is communicated with the port B on the valve block through an axial groove connected to the middle group of interconnecting holes on the second valve sleeve and through a channel on the valve block.

* * * * *